Patented Dec. 4, 1923.

1,475,959

UNITED STATES PATENT OFFICE.

HERBERT H. MEYERS, OF PITTSBURGH, PENNSYLVANIA, ASSIGNOR TO ARMOUR FERTILIZER WORKS, OF CHICAGO, ILLINOIS, A CORPORATION OF NEW JERSEY.

DOUBLE-SUPERPHOSPHATE PROCESS.

No Drawing.     Application filed December 21, 1922. Serial No. 608,351.

*To all whom it may concern:*

Be it known that I, HERBERT H. MEYERS, a citizen of the United States, residing at Pittsburgh, in the county of Allegheny and State of Pennsylvania, have invented certain new and useful Improvements in Double-Superphosphate Processes, of which the following is a specification.

Double superphosphate, the usual designation of the material produced by the treatment of phosphate-rock with phosphoric acid, ordinarily contains between 40 and 50% of $P_2O_5$, whereas acid phosphate produced by the acidulation of phosphate rock with sulphuric acid contains between 16 and 20% $P_2O_5$.

The first step in the heretofore known process of the manufacture of double superphosphate is the production of phosphoric acid, and this is usually accomplished by the treatment of phosphate-rock with dilute sulphuric acid, the result not being satisfactory when strong sulphuric acid is used.

In this way a dilute phosphoric acid is produced containing not over 30% orthophosphoric acid ($H_3PO_4$) equivalent to 21.7% $P_2O_5$; in fact, an acid as strong as this is not ordinarily obtained, the average content probably being closer to 25%.

In order that this acid may be used in the usual process for producing double superphosphate, it must be concentrated until its $H_3PO_4$ content is practically doubled, but concentrating the acid is a costly and difficult procedure.

After the acid has been thus intensified in strength, it is mixed with phosphate-rock in the proper proportions and in the usual manner of mixing the ingredients of an acid phosphate, and then the mixture is dropped into a den and permitted to "set" or harden. When "set" it is dug or removed from the den in any of the usual ways of emptying a den used for that purpose.

The double superphosphate so produced contains too much moisture for employment in a fertilizer, and must, therefore, be dried down to about 9% water content by some artificial method of drying, after which it is disintegrated.

Although double superphosphate is a desirable material for a number of purposes in the fertilizer industry, the numerous and difficult operations necessary for its preparation by the usual process render it too expensive per unit of available phosphate contained for very general use.

If, however, the following novel and improved process is used, the procedure is much simplified, and a double superphosphate equal in every respect to the product of the usual process is immediately obtained at a considerably reduced cost.

According to this new and advantageous process, dilute phosphoric acid is produced as in the customary way, but instead of concentrating it as a separate operation, the proper amount of phosphate-rock is added to it directly in an agitator and the slurry so formed is run continuously into and through a direct heat drier.

In such dryer, under the influence of the heat, the bulk of the reaction between the acid and the rock occurs, and the excess water is more or less simultaneously evaporated, so that a sufficiently dry product is discharged from the delivery end of the dryer in a very good chemical and physical condition.

All that is necessary before using this product is to pass it through a disintegrator to insure the desired fineness.

According to the old process the following steps were required.

(*a*) Preparation of dilute phosphoric acid.
(*b*) Concentration of the phosphoric acid.
(*c*) Mixing the acid and rock.
(*d*) Emptying the den.
(*e*) Drying the double superphosphate.
(*f*) Disintegrating the superphosphate.

But, in accordance with the new process, only the following steps are required:

(*a*) Preparation of dilute phosphoric acid.
(*b*) Mixing the acid and the rock to form a slurry.
(*c*) Heating the slurry to simultaneously accelerate the chemical reaction and dry the double superphosphate produced to a solid product.
(*d*) Disintegrating the double superphosphate.

Owing to the simplification of the process, as indicated by the above-noted steps, much of the expensive apparatus required by the usual process, such as the acid concentrators and the acid phosphate mixers and dens, may be dispensed with, and this results in a material or substantial reduction in the capital investment required for a given production.

Further, the old process is essentially a batch or discontinuous one, that is to say, the rock and acid are mixed in batches and dropped into the den, and when the den is filled, the mixing is interrupted, and some time allowed to elapse before the den is emptied, wherefore, any one den is being filled not over 50% of the time.

The new process, on the other hand, may be operated as a continuous method, the dilute acid and ground rock being run continuously into an agitator from which the mixture or slurry flows continuously to the heater and dryer.

This method of operation assures maximum production per dollar invested and therefore reduces the overhead costs to a minimum.

The fuel required by the novel and improved process, constituting the subject-matter of this invention, is appreciably less than that needed for the usual method, because according to the latter much heat is required for the concentration of the phosphoric acid, and the thermal efficiencies of concentrators are not as great as those of direct heat dryers. Also, the reactions occurring in the dryer are exothermic and the heat thus generated assists in the drying.

The new process, therefore, has the advantages of:

(a) Fewer and less difficult operations.
(b) Lower initial investment.
(c) Continuous operation.
(d) Lower fuel consumption.
(e) Lower cost per unit of available phosphate.

The preferable method of operation is to produce the dilute phosphoric acid by the well known Dorr system of agitation and continuous decantation, for example, such system may consist of two or three agitators and about six thickeners.

Into the first of such three agitators there is introduced continuously ground phosphate-rock, sulphuric acid of a strength from about 50° to 60° Bé., and weak phosphoric acid liquor from thickener No. 2.

The ratio of rock to 50° Bé. acid used, by weight, would be approximately one part of rock to 1.15 parts of 50° Bé. acid.

The slurry so formed passes through the agitators and into the first thickener, the strong clear liquor from which runs continuously to another or single agitator.

The settled sludge is pumped up through the series of thickeners and is washed by counter-current decantation, the exhausted sludge from the last thickener No. 6 being carried to the waste.

The strong liquor from thickener No. 1 will contain possibly as much as 20% $P_2O_5$ by weight, and to it, in such other agitator into which it is delivered as mentioned above, is added continuously ground phosphate-rock in the approximate ratio of one pound of rock per pound of $P_2O_5$ content of the liquor.

The slurry so formed in the agitator runs continuously into an inclined, rotary, direct-heat, cylindrical dryer, and is passed therethrough as rapidly as is compatible with the desired condition of the product, which should be sufficiently dry for immediate use as a constituent of a fertilizer mixture.

The speed of operation depends in large measure upon the rate of fuel consumption and the entire process is regulated so that the production will keep pace with the yield of phosphoric acid from the Dorr system.

The rotary, inclined, direct-heat dryer is preferably operated so that the combustion gases move concurrently and in contact with the slurry, thus preventing overheating of the product.

Any source of fuel may be used for heating the dryer and the latter is desirably provided with means for preventing the charge from sticking to or building up in it, and, accordingly, the dryer is preferably provided with a drag-chain or scraper arms.

The discharged product from the dryer is passed through any of the usual types of fertilizer disintegrators to insure uniform fineness, and it is then conveyed to storage.

To those skilled in this art it will be clear that many minor changes may be made in the method or process as outlined herein, and, accordingly, the invention is not limited and restricted to the precise and exact details presented above, the scope of the invention being clearly defined in the appended claims.

For example, the phosphate used for producing the phosphoric acid may be advantageously ground wet with weak liquor from the Dorr thickeners and under certain circumstances wet grinding of the phosphate rock may be practiced in the subsequent steps of the process.

I claim:

1. The process of producing double superphosphate comprising forming a slurry by adding ground phosphate-rock to commercial dilute phosphoric acid the strength of which is insufficient to effect complete reaction without the application of heat, and completing the chemical reaction by the application of heat and simultaneously drying the slurry to a solid product by such heat.

2. The process of producing double superphosphate comprising forming a slurry by adding ground phosphate-rock to commercial dilute phosphoric acid the strength of which is insufficient to effect complete reaction without the application of heat, and completing the chemical reaction and simultaneously drying the slurry to a solid product both during the application of heat and agitation of the slurry.

3. A process of the character described, comprising forming a slurry of ground phosphate-rock and phosphoric acid, and heating and drying such slurry by causing the latter, while agitated, and combustion gases in contact therewith to travel concurrently.

4. A process of the character described, comprising producing phosphoric acid by treating phosphate-rock with dilute sulphuric acid, forming a slurry of phosphate-rock and said phosphoric acid, and heating and drying such slurry by causing the latter, while agitated, and combustion gases in contact therewith to travel concurrently.

5. A process of the character described, comprising continuously producing phosphoric acid by continuously treating phosphate-rock with dilute sulphuric acid, continuously forming a slurry of phosphate-rock and said phosphoric acid, and continuously heating and drying such slurry.

6. A process of the character described, comprising continuously producing phosphoric acid by continuously treating phosphate-rock with dilute sulphuric acid, continuously forming a slurry of phosphate-rock and said phosphoric acid, and continuously heating and drying such slurry by causing the latter, while agitated, and combustion gases in contact therewith to travel concurrently.

7. A process of the character described, comprising forming a slurry of ground phosphate-rock and a liquid containing approximately 20% by weight of $P_2O_5$, and heating and drying such slurry.

8. A process of the character described, comprising forming a slurry of ground phosphate-rock and a liquid containing approximately 20% by weight of $P_2O_5$, and heating and drying such slurry by combustion gases in direct contact therewith while the slurry is agitated.

9. A process of the character described, comprising forming a slurry of ground phosphate-rock and a liquid containing approximately 20% by weight of $P_2O_5$, the ratio of ingredients being about one pound of rock to each pound of $P_2O_5$ content of the liquid, and heating and drying the slurry to effect the chemical reaction and to produce a solid product.

In witness whereof I have hereunto set my hand and seal.

HERBERT H. MEYERS. [L. S.]